Oct. 17, 1967  H. E. ZANKEY  3,347,026
FLUID SEPARATOR
Filed Jan. 14, 1965
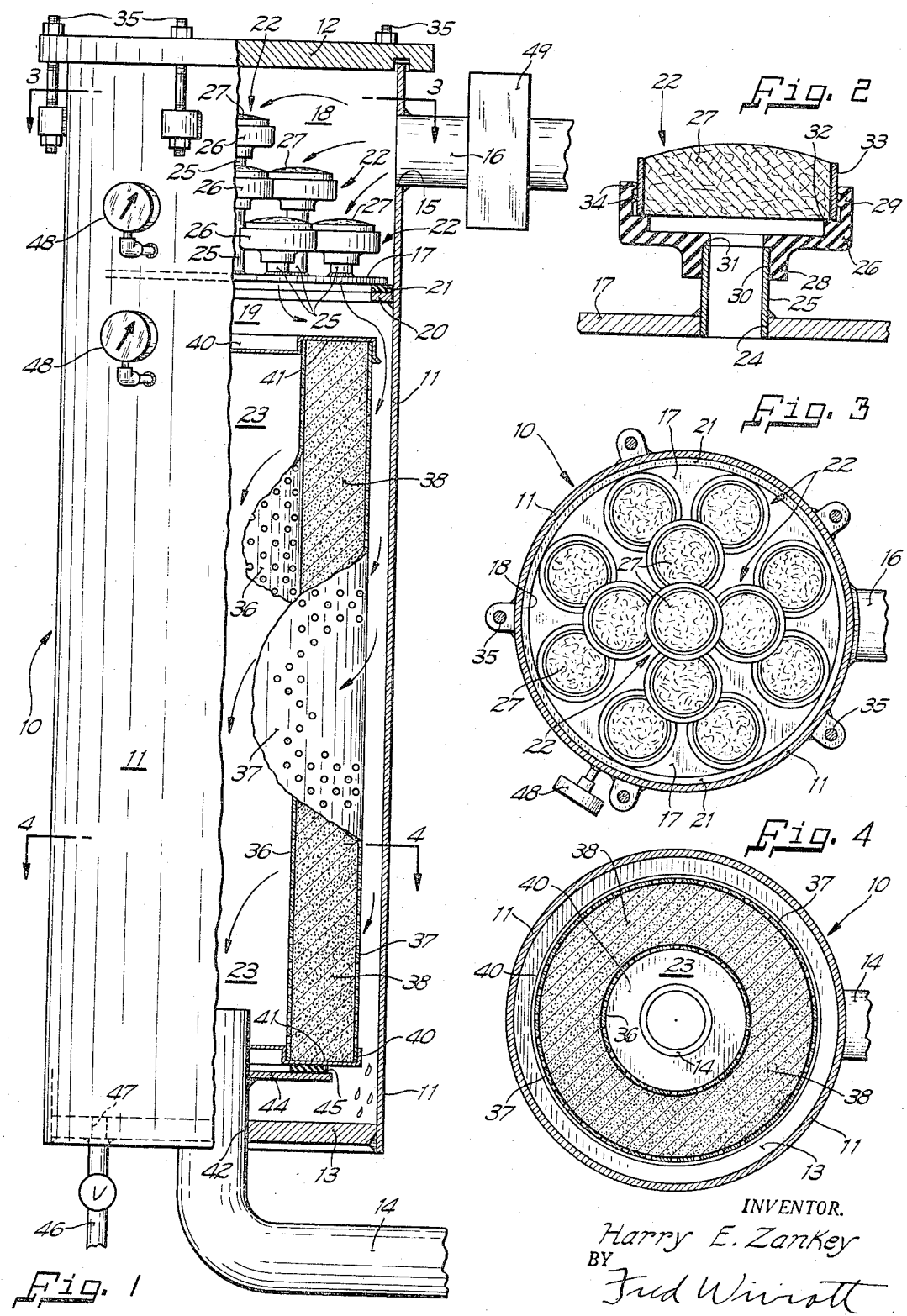
INVENTOR.
Harry E. Zankey
BY Fred Wirrott
Attorney United States Patent Office 3,347,026
Patented Oct. 17, 1967

3,347,026
FLUID SEPARATOR
Harry E. Zankey, Pittsburgh, Pa., assignor to McGraw-Edison Company, Milwaukee, Wis., a corporation of Delaware
Filed Jan. 14, 1965, Ser. No. 425,454
7 Claims. (Cl. 55—316)

This invention relates to apparatus for the removal of fluids from gas streams and, more particularly, to the separation of fluids, such as oil, from air or other gas streams.

Oil in a typical air or gas stream generally appears either as a vapor, which is a true gas, or liquid oil in the form of suspended droplets which vary widely in size.

The percentage of a fluid in a gas stream that appears as a vapor depends upon its vapor pressure. For example, because the vapor pressure of lubricating type oil is relatively low, only a small percentage exists as a vapor in a gas stream. The oil vapor that does occur can be removed from a gas stream by adsorbents, such as activated carbon, which will adsorb the vapor up to the limit of its capacity. An adsorbent will hold less of a light hydrocarbon vapor such as methane than heavier hydrocarbon vapors, such as ethane or propane.

Of the oil droplets, those at the small end of the size range, while actually being a liquid, are small enough to be buffeted about by collision with air molecules. The erratic path of the small oil globules due to molecular collisions greatly increases the probability of contact with an adsorbent surface to effect their removal from the gas stream. The relatively large sized oil droplets, having a high inertia, can readily be removed from a gas stream by providing a tortuous flow path.

As the size of the droplets increases, the effect of molecular collision decreases. Droplets in the size range which are not significantly influenced by molecular collision, but whose inertia is still low enough that they will readily follow changes of direction along the air stream, present the greatest removal problem. Such intermediate sized droplets not only cannot be removed from a gas stream by a tortuous flow path, but they also cannot effectively be removed by adsorbent material, because many of them do not contact the adsorptive surface.

It is an object of the invention to provide a device for removing a fluid from a gas stream wherein the fluid exists both as a vapor and as suspended droplets.

It is a further object of the invention to provide a new and improved separator for removing oil in the form of vapor and various sized suspended droplets from a gas stream.

Another object of the invention is to provide a separator for removing fluid from a gas stream and having two stages, wherein the first stage comprises means for mechanically removing most of the suspended fluid droplets from a gas stream and a second stage for adsorbing fluid vapor and the remaining droplets.

A more specific object of the invention is to provide a device for separating fluid from a gas stream and comprosing a hollow casing divided by an apertured diaphragm into an inlet chamber and an outlet chamber wherein coalescing means covers the diaphragm apertures and an adsorption unit covers the outlet in said casing. A still more specific object of the invention is to provide such a separator with means for providing a tortuous flow path between said coalescing means and said adsorption unit.

These and other objects and advantages of the instant invention will become more apparent from the detailed description thereof taken with the accompanying drawings in which:

FIG. 1 is a side elevational view, with parts broken away, of the fluid separator according to the instant invention;

FIG. 2 is a sectional view of one of the coalescer elements which form a part of the fluid separator illustrated in FIG. 1;

FIG. 3 is a view taken along lines 3—3 of FIG. 1; and

FIG. 4 is a view taken along lines 4—4 of FIG. 1.

Referring now to the drawings in greater detail, FIG. 1 shows a separator 10 for removing a fluid, such as oil, from a gas stream, and including a generally cylindrical metallic tank 11, which is sealed at its upper end by a suitably gasketed cover plate 12 that is removably held in a closed position by bolts 35. The lower end of the tank 11 is sealed by an annular closure plate 13 which is suitably affixed in a sealing relation at its outer periphery to the lower end of the tank 11 and at its inner periphery to an outlet pipe 14. In addition, an aperture 15 is formed adjacent the upper end of the tank 11 for receiving the end of an inlet pipe 16 so that the tank 11 may be placed in communication with the gas stream to be treated.

A diaphragm consisting of a steel plate 17 is disposed within the casing 11 and below the aperture 15 for dividing said casing into an upper or inlet chamber 18 and a lower or outlet chamber 19. The steel plate 17 is supported on an annular ring 20 which is welded to the interior of the casing 11. An annular gasket 21 is disposed between the ring 20 and the steel plate 17 to seal the upper chamber 18 from the lower chamber 19. A plurality of coalescer units 22 are supported by the diaphragm 17 within the upper chamber 18, while an adsorption unit 23 is supported within the lower chamber 19.

As seen in FIGS. 1, 2 and 3, the diaphragm 17 has a plurality of apertures 24 formed therein and a short pipe section 25 is welded in each aperture for supporting the various coalescer units 22. The pipes 25 are arranged in outer and intermediate generally concentric circles with a single pipe 25 disposed in the center thereof. The pipes 25 increase in length from the outer periphery to the center of the diaphragm 17 so that the width of the coalescer units 22 may be substantially wider than the distance between the circles of pipes 25 would normally permit them to be. This allows the coalescer units to be staggered in overlapping relation as seen in FIGS. 1 and 3.

Each of the coalescer units 22 includes a support member 26 and a coalescer element 27. The support member 26 consists of an oil resistant material such as neoprene rubber and has a lower base portion 28 and a upper support portion 29. The base portion 28 has an axial bore 30 formed therein for fitting snugly over the upper end of the pipe section 25 and a reduced diameter portion 31 at it upper end for overlaying the upper end of the pipe section 25 to provide a seal and thereby to prevent the gas being treated from bypassing the coalescer element 27. The support portion 29 of the member 26 is generally cup-shaped and has a generally annular shoulder 32 for supporting the coalescer element 27 in an elevated position to permit gas being treated to circulate through all portions of said element.

The coalescer element 27 is surrounded by an annular metallic shell 33 which provides support therefor. A pair of annular ribs 34 are formed on the inner surface of the upper cup-shaped portion 29 for resiliently engaging the outer surface of the shell 33 to provide a seal therebetween.

The coalescer element 27 consists of a material having extremely fine pores whose size ranges generally below one micron and may be composed of any suitable porous material, such as sintered metal or a cellulose matte.

The adsorption unit 23 consists of a pair of concentric inner and outer perforated metal cylinders 36 and 37, respectively, which are supported by an upper metallic end cap 38 and a lower metallic end cap 40. Each of the end caps 38 and 40 have a formed annular portion 41 for supporting the cylinders 36 and 37 in concentric spaced apart relation and for sealing the ends of said cylinders. The space between the cylinders 36 and 37 is filled by a porous adsorbent material 38 such as activated alumina or activated carbon.

The outlet pipe 14 extends concentrically into the lower end of the casing 11 and through a central aperture 42 formed in the lower closure member 13. An annular metallic plate 44 is suitably affixed to the outlet pipe 14 interiorly of the casing 11 and below the upper end of said pipe for supporting the adsorption unit 23. A gasket 45 is disposed between the lower end cap 40 of the adsorption unit 23 of the plate 44 to prevent the gas from bypassing the adsorptive material 38. In this manner the terminal end of the outlet pipe 14 and the adsorption unit 23 are elevated above the lower end of the casing 11 to provide a reservoir for the collection of fluid.

It will be recalled that when oil is to be separated, the gas entering the upper chamber 18 through the inlet pipe 16 contains oil vapor and suspended oil droplets. The flow of the oil containing gas through the various coalescer elements 27 causes most of the suspended oil particles to touch one another and agglomerate as the gas passes through the porous material 27. The coalescing effect of the oil causes it to drip in relatively large drops from the coalescer units 22 and through the pipe sections 25 into the lower chamber 19 and to run down the sides of the vessel 11 to the lower closure plate 13, where it may be removed through a conduit 46 whose terminal end is affixed in a suitable aperture 47 formed in the lower end plate 13. In addition, because the upper end cap 40 of the adsorption unit 23 is imperforate, the oil bearing gas which passes through the pipe sections 25 and the apertures 24 in the diaphragms 17 must change direction and travel radially outwardly before it can pass through the perforations in the outer cylinder 37 of the unit 23. As a result, any agglomerated oil droplet still carried by the gas stream tend to strike the inner wall of the casing 11 and run down to the bottom closure plate 13.

As a result of this coalescing action, only the oil vapor and the relatively smaller droplets remain in the gas stream. After passage through the coalescer units 22, the gas stream passes through the perforations in the outer cylinder 37 of the adsorption unit 23, through the adsorbent material 38, through the perforations in the inner cylinder 36 and out of the outlet pipe 14. The oil vapor is directly removed by contact with the surface of the adsorbent material 38. In addition, the erratic path of the small globules increases the probability that they will contact the adsorbent material 38 and thereby be removed from the gas stream.

It can thus be seen that the two-stage oil separator, according to the instant invention, effectively removes all of the oil from the gas stream. Most of the oil droplets are removed by the coalescer elements 27 and the tortuous flow path between said elements and the adsorption unit 23, while the relatively smaller droplets and the oil vapor are removed by the adsorption unit 23.

It will be appreciated by those skilled in the art that adsorption unit 23 has a limited adsorptive capacity. Thus, because the oil vapor and extremely small oil droplets make up only a small percentage of the total oil load, the action of the coalescer elements 27 and the flow path configuration in removing most of the oil greatly increases the load handling ability of the separator 10.

Pressure gages 48 are provided on the opposite sides of the diaphragm 17 to measure the pressure drop across the coalescer units. If there are solid particles entrained in the gas stream, they will tend to collect on the coalescer units and thereby cause an increased pressure drop across the diaphragm 17. When this pressure drop reaches a predetermined value, replacement of the coalescer units may be indicated. The life of the coalescer elements 27 may be substantially extended, however, by providing a filter 49 in the inlet pipe 16 to prefilter solid particles from the air stream.

While only a single embodiment of the instant invention has been shown and described, it is not intended to be limited thereby but only by the scope of the appended claims. In addition, while the separator 10 has been discussed with respect to the removal of oil from a gas stream, those skilled in the are will appreciate that it is also operative for the removal of other liquids as well, and in particular those having a boiling temperature appreciably higher than that of water.

I claim:

1. A device for the separation of a fluid from a gas stream, comprising a hollow casing having an inlet adjacent its upper end and an outlet adjacent its lower end, means disposed intermediate the ends of said casing for separating said casing into an upper chamber and a lower chamber, a plurality of openings formed in said separating means, a coalescer unit disposed over each of said openings for coalescing the fluid droplets in said gas stream, each of said coalescer units including a body of porous material having relatively small sized pores, said outlet having a conduit extending therethrough into said housing and terminating at a point which is elevated above the lower end of said casing to permit the separated fluid to collect thereat, an adsorption unit disposed in the lower end of said casing and including a body of porous adsorptive material disposed in surrounding relation to said outlet and elevated above the lower end of said casing and deflecting means in the path of the gas stream intermediate said openings and said adsorptive material for diverting said gas stream toward said casing to cause said coalesced fluid droplets carried by said stream to strike said casing.

2. The device of claim 1 further comprising filter means for removing solid particles from said gas stream, said filter being located adjacent said inlet and so disposed that the entire gas stream passes therethrough prior to reaching said coalescing units.

3. The device of claim 1 wherein said deflecting means includes a flange portion extending downwardly and outwardly toward said casing with the lowermost edge thereof disposed radially outward with respect to the maximum projection of said adsorption unit whereby droplets of material which collects on said deflecting means is permitted a free fall from said deflecting means to the lower end of said casing.

4. A device for the separation of a fluid from a gas stream, comprising a hollow casing having an inlet adjacent one end and an outlet adjacent its other end, diaphragm means disposed intermediate the ends of said casing for separating said casing into an inlet chamber and an outlet chamber, a plurality of openings formed in said diaphragm means, a coalescer unit disposed over each of said openings for coalsecing the fluid droplets in said gas stream, each of said coalescer units including a body of porous material having relatively small sized pores and each being affixed in a sealed relation over one of said openings, an adsorption unit disposed in said outlet chamber and including a pair of spaced concentric perforated cylinders, the axis of said cylinders being generally parallel to that of said openings, wall means closing the ends of said cylinders, a quantity of porous adsorptive material filling the space between said cylinders, the outer of said pair of said cylinders being exposed to the openings in said diaphragm means and the inner of said pair of said cylinders being exposed to said outlet, said outlet comprising a conduit means extending through the lower end of said casing and into the space encompassed by the inner one of said cylinders and to a point above the lower end of said casing, said wall means including an upper end cap underlying said openings to divert said gas stream flowing downwardly from said openings radially outwardly whereby said gas stream being diverted radially outwardly about said end cap and radially inwardly through said adsorptive material causes agglomerated fluid droplets carried thereby to strike said casing wall and collect in said outlet chamber and means connected to said outlet chamber and exposed to said diaphragm for removing liquid from said outlet chamber.

5. A device for the separation of a fluid from a gas stream, comprising a hollow, generally cylindrical casing having an inlet adjacent one end and an outlet adjacent its other end, said outlet comprising a conduit means projecting through a wall of said casing and terminating at a point above the lower end of said casing, diaphragm means disposed intermediate the ends of said casing and lying in a plane generally normal to the axis of said casing for separating said casing into an inlet chamber and an outlet chamber, a plurality of openings formed in said diapheragm means, a coalescer unit disposed over each of said openings for coalescing the fluid droplets in said gas stream, each of said coalescer units including a body of porous material having relatively small sized pores and each being affixed in a sealed relation over one of said openings, an adsorption unit disposed in said outlet chamber and including a perforated cylindrical outer shell disposed in surrounding relation to said outlet about a generally vertical axis, an upper end cap and a quantity of porous adsorptive material disposed within and along the inner surface of said shell, said upper end cap underlying said openings to divert said gas stream flowing downwardly from said openings radially outwardly whereby said gas stream being diverted radially outwardly about said end cap and radially inwardly through said adsorptive material causes agglomerated fluid droplets carried thereby and strike said casing wall and collect in said outlet chamber.

6. A device for the separation of a fluid from a gas stream, comprising a hollow casing having an inlet adjacent one end and an outlet adjacent the end opposite said one end, said outlet comprising a conduit means projecting through and terminating at a point within and spaced apart from said end opposite said one end, diaphragm means disposed intermediate the ends of said casing for separating said casing into an inlet chamber and an outlet chamber, a plurality of openings formed in said diaphragm means, a conduit member affixed in each of said openings and extending into said inlet chamber, certain of said conduit members being longer than others, a coalescer unit disposed on the free end of each of said conduit members for coalescing the fluid droplets in said gas stream, each of said coalescer units including a body of porous material having relatively small sized pores and each being affixed in a sealing relation over the free end of one of said conduit members, the width of said porous material being substantially larger than that of said conduit members and being arranged in a overlapping relation on adjacent conduit members of different length, an adsorption unit disposed in said outlet chamber and including a body of porous adsorptive material disposed in surrounding relation to said outlet and in the path of gas flow between said plurality of openings and said outlet.

7. A device for the separation of a fluid from a gas stream, comprising a hollow casing having an inlet adjacent one end and an outlet adjacent the end opposite said one end, diaphragm means disposed intermediate the ends of said casing for separating said casing into an inlet chamber and an outlet chamber, a plurality of openings formed in said diaphragm means, a conduit member affixed in each of said openings and extending into said inlet chamber, certain of said conduit members being longer than others, a coalescer unit disposed on the free end of each of said conduit members for coalescing the fluid droplets in said gas stream, each of said coalescer units including a body of porous material having relatively small sized pores and each being affixed in a sealing relation over the free end of one of said conduit members, the width of said bodies of porous material being substantially larger than that of said conduit members and being arranged in an overlapping relation on adjacent conduit members of different length, an adsorption unit disposed in said outlet chamber and including a pair of spaced concentric perforated cylinders, the axes of said cylinders being substantially parallel to those of said conduit members, means closing the ends of said cylinders, a quantity of porous adsorptive material filling the space between said cylinders, one of said cylinders being exposed to the openings in said diaphragm means and the other of said cylinders being exposed to said outlet, said outlet comprising a conduit means extending through the lower end of said casing and into the space encompassed by the inner one of said cylinders and to a point above end of each of said conduit members for coalescing the being disposed in the path of gas flow between said openings and said outlet, and means connected to said outlet chamber and exposed to said diaphragm for removing fluid from said outlet chamber.

References Cited

UNITED STATES PATENTS

| | | | |
|---|---|---|---|
| 735,193 | 8/1903 | Allert | 55—343 |
| 1,463,990 | 8/1923 | Wilson. | |
| 2,190,138 | 2/1940 | Smith et al. | 55—50 X |
| 2,404,468 | 7/1946 | Vokes et al. | 55—387 |
| 3,034,656 | 5/1962 | Kasten. | |
| 3,088,592 | 5/1963 | Clark. | |
| 3,189,182 | 6/1965 | Kasten | 210—492 |
| 3,246,455 | 4/1966 | Boddy. | |

FOREIGN PATENTS 1,158,809   2/1958   France.

FRANK W. LUTTER, *Primary Examiner.*

HARRY B. THORNTON, *Examiner.*

D. TALBERT, *Assistant Examiner.*

UNITED STATES PATENT OFFICE
CERTIFICATE OF CORRECTION

Patent No. 3,347,026                         October 17, 1967

Harry E. Zankey

It is hereby certified that error appears in the above numbered patent requiring correction and that the said Letters Patent should read as corrected below.

Column 5, lines 21 and 22, for "diapheragm" read -- diaphragm --; line 38, for "thereby and strike" read -- thereby to strike --; column 6, line 36, for "end of each of said conduit members for coalescing the" read -- the lower end of said casing, said adsorptive material --.

Signed and sealed this 5th day of November 1968.

(SEAL)
Attest:

Edward M. Fletcher, Jr.                       EDWARD J. BRENNER
Attesting Officer                             Commissioner of Patents